(12) United States Patent
Sheppard et al.

(10) Patent No.: US 9,552,464 B2
(45) Date of Patent: Jan. 24, 2017

(54) METHOD AND APPARATUS FOR PROVIDING CONTENT PROTECTION IN A COMPUTER SYSTEM

(71) Applicant: Tangentix Limited, Sheffield (GB)

(72) Inventors: Paul Edmund Fleetwood Sheppard, Glasgow (GB); Edward Michael French, West Yorkshire (GB)

(73) Assignee: Tangentix Limited, Sheffield (GB)

( * ) Notice: Subject to any disclaimer, the term of this patent is extended or adjusted under 35 U.S.C. 154(b) by 0 days.

(21) Appl. No.: 14/800,930

(22) Filed: Jul. 16, 2015

(65) Prior Publication Data
US 2016/0021132 A1    Jan. 21, 2016

(30) Foreign Application Priority Data

Jul. 16, 2014   (GB) .................... 1412605.6

(51) Int. Cl.
*G06F 21/10* (2013.01)
*H04L 29/06* (2006.01)
*H04L 29/08* (2006.01)

(52) U.S. Cl.
CPC .......... *G06F 21/10* (2013.01); *H04L 63/1425* (2013.01); *H04L 67/22* (2013.01); *H04L 63/0428* (2013.01); *H04L 2463/103* (2013.01)

(58) Field of Classification Search
CPC ..................................................... G06F 21/10
See application file for complete search history.

(56) References Cited

U.S. PATENT DOCUMENTS

| 6,775,779 | B1 * | 8/2004 | England | G06Q 10/10 705/51 |
| 6,976,175 | B2 * | 12/2005 | England | G06Q 10/10 705/51 |
| 6,986,059 | B2 * | 1/2006 | England | G06Q 10/10 705/51 |
| 7,275,161 | B2 * | 9/2007 | Ochi | G06F 21/10 713/164 |
| 7,496,769 | B2 * | 2/2009 | Lampson | G06Q 10/10 705/51 |

(Continued)

FOREIGN PATENT DOCUMENTS

| WO | 2014005547 A1 | 1/2014 |
| WO | 2014041366 A2 | 3/2014 |

OTHER PUBLICATIONS

Wei et al.; Managing security of virtual machine images in a cloud environment; Published in: Proceeding CCSW '09 Proceedings of the 2009 ACM workshop on Cloud computing security; 2009; pp. 91-96; ACM Digital Library.*

(Continued)

*Primary Examiner* — Bradley Holder
(74) *Attorney, Agent, or Firm* — Coats & Bennett, PLLC

(57) ABSTRACT

A computer system includes a server device which provides one or more content packages each comprising a plurality of asset files. A client device stores the content packages, and generates a virtual environment based on the asset files to be displayed on a display unit. A tracker is arranged to record an asset list directly or indirectly representing a sequence of the asset files according to progress through the virtual environment at the client device, and to distinguish between legitimate and non-legitimate behavior of the client device according to the recorded asset list.

16 Claims, 15 Drawing Sheets

(56) References Cited

U.S. PATENT DOCUMENTS

| | | | |
|---|---|---|---|
| 8,127,365 B1* | 2/2012 | Liu | H04L 63/105 726/26 |
| 8,667,590 B1* | 3/2014 | Lee | H04L 63/1416 713/188 |
| 9,058,493 B1* | 6/2015 | Gouesbet | G06F 21/60 |
| 2004/0242321 A1 | 12/2004 | Overton | |
| 2004/0243836 A1* | 12/2004 | England | G06Q 10/10 726/26 |
| 2004/0250089 A1* | 12/2004 | Ochi | G06F 21/10 713/189 |
| 2005/0097053 A1* | 5/2005 | Aaltonen | H04L 63/0428 705/51 |
| 2005/0097355 A1* | 5/2005 | England | G06Q 10/10 726/26 |
| 2005/0235362 A1* | 10/2005 | England | G06Q 10/10 726/27 |
| 2005/0273629 A1* | 12/2005 | Abrams | G06F 21/10 713/189 |
| 2006/0128471 A1 | 6/2006 | Willis et al. | |
| 2007/0033414 A1* | 2/2007 | Dunko | G06F 21/10 713/186 |
| 2009/0067624 A1* | 3/2009 | Cobelo | G06F 21/78 380/46 |
| 2009/0122982 A1* | 5/2009 | Abrams | G06F 21/10 380/45 |
| 2010/0186090 A1* | 7/2010 | Alve | G06F 21/10 726/26 |
| 2014/0344577 A1* | 11/2014 | Abrams | G06F 21/10 713/168 |

OTHER PUBLICATIONS

Hay et al.; Storm Clouds Rising: Security Challenges for IaaS Cloud Computing; Published in: System Sciences (HICSS), 2011 44th Hawaii International Conference on; Date of Conference: Jan. 4-7, 2011; IEEE Xplore.*

* cited by examiner

METHOD AND APPARATUS FOR PROVIDING CONTENT PROTECTION IN A COMPUTER SYSTEM

RELATED APPLICATIONS

This application claims priority from foreign application GB 1412605.6 filed Jul. 16, 2014 in the United Kingdom, and which is expressly incorporated herein by reference in its entirety.

BACKGROUND

Technical Field

The present disclosure relates generally to the field of protecting content in a computer system.

Description of Related Art

There is a growing demand for delivering games and other content to be played at a client device of the user. However, the existing distribution models give rise to many problems, especially in relation to digital rights management, in order to prevent unauthorised use or redistribution of high-value content.

Delivering a game or other large multimedia content over a network is limited by the characteristics of the network, such as the availability of bandwidth, consistency of the bandwidth, cost to the user, potential throttling and/or network-imposed hard caps on the volume of data that can be downloaded by the user. These problems are exacerbated for very large data volumes (large file sizes) which take a long time to download (e.g. tens of minutes, or even several hours).

There is a desire to allow a user to enjoy a sample of the content, prior to making a purchase of the full content. Also, there is a desire to allow rental of content for a limited time period, in exchange for a certain payment. These and other new mechanisms for delivering content have been inhibited by the existing content delivery infrastructure.

It is now desired to provide a system which addresses one or more of these limitations of the current art, or other such limitations, as will be appreciated from the discussion and description herein. In particular, it is desired to develop other approaches for providing content, such as video games, on a client device.

SUMMARY

In one example there is described a computer system comprising: a server device configured to supply one or more content packages to a client device, wherein each content package comprises a plurality of asset files, and wherein the client device is configured to store the asset files from the server device, and to generate a virtual environment based on the asset files to be displayed on a display unit associated with the client device; and a tracker configured to record a sequence of access requests made by the client device in relation to the asset files according to progress through the virtual environment, and to distinguish between legitimate and non-legitimate behaviour according to the recorded sequence of access requests.

In one example, the tracker is configured to hold a model gathered by observing a population of other client devices which have progressed through the virtual environment using the asset files, and to compare a current access request in relation to the asset files by the client device against the model to distinguish between the legitimate and non-legitimate behaviour.

In one example, the tracker is configured to record an elapsed time value for each access request, the elapsed time value representing an elapsed time of progress through the virtual environment at the client device, and to compare the elapsed time value of the current access request against the model which represents a statistical distribution of corresponding elapsed time values gathered from the population of other client devices.

In one example, the tracker is configured to compare a plurality of the elapsed time values for the sequence of access requests made in response to progress through the virtual environment at the client device against the model to distinguish between the legitimate and non-legitimate behaviour of the client device.

In one example, the access requests include at least one of: a file access request made by the client device to access a particular asset file; a package access request made by the client device to access a content package containing one or more of the asset files; a key access request made by the client device to access a decryption key which decrypts at least one of the asset files or decrypts a content package containing one or more of the asset files.

In one example, the tracker records an asset list comprising an ordered list of the content packages which are downloaded from the server device to the client device to generate the virtual environment in response to progress through the virtual environment.

In one example, the content packages are associated with respective sections of the virtual environment, such that progress through the virtual environment involves a plurality of the content packages in sequence, and the tracker is configured to record an asset list identifying the sequence of the content packages supplied to the client device.

In one example, each content package is encrypted and is associated with a respective decryption key, and the tracker is configured to record the sequence of decryption keys supplied to the client device.

In one example, the tracker records a sequence of the asset files used by the client device to generate the virtual environment in response to progress through the virtual environment at the client device.

In one example, the tracker records a sequence of file access requests made at the client device to retrieve the asset files from a local storage device.

In one example, the tracker comprises a disc access module on the client device arranged to intercept system calls made by executing code to retrieve the asset files from the local storage device into a memory to be processed by a processor to generate the virtual environment at the client device.

In one example, each of the content packages comprises a plurality of the asset files having a plurality of different file types and an original file order, wherein the server device packs the asset files in the content package according to their file type, and wherein the client device unpacks the asset files from the content package and stores the asset files of the unpacked content package according to their original file order.

In one example, the server device applies one of a plurality of predetermined compression algorithms to the packed asset files according to their file type, and the client device applies a corresponding decompression algorithm to the asset files according to their file type.

In one example there is described a method of providing content from a server device to a client device over a network, comprising: supplying one or more content packages to a client device, wherein each said content package comprises a plurality of asset files, and wherein the client device is configured to store the asset files and to generate a virtual environment based on the asset files to be displayed on a display unit associated with the client device; recording a sequence of access requests made by the client device in relation to the asset files according to progress through the virtual environment, and distinguishing between legitimate and non-legitimate behaviour of the client device according to the recorded access requests.

In one example the method includes holding a model gathered by observing a population of other client devices which have progressed through the virtual environment using the asset files, and comparing a current access request by the client device in relation to the asset files against the model to distinguish between the legitimate and non-legitimate behaviour.

In one example the method includes recording an elapsed time value for each of the access requests, the elapsed time value representing an elapsed time of progress through the virtual environment at the client device, and comparing the elapsed time value of the current access request against the model which represents a statistical distribution of corresponding elapsed time values gathered from the population of other client devices, to distinguish between the legitimate and non-legitimate behaviour of the client device in relation to the current access request.

In one example the access request includes at least one of: a file access request made by the client device to access a particular asset file; a package access request made by the client device to access a particular content package; and a key access request made by the client device to access a decryption key which decrypts one or more of the asset files or decrypts a particular content package.

In one example the method includes extracting a plurality of asset files from a content package; recording metadata which determines an original order of the asset files within the content package; sorting the asset files by their file type; compressing the asset files using a plurality of different compression algorithms according to their respective file type, including compressing asset files of a first file type with a first compression algorithm and compressing asset files of a second file type with a second compression algorithm; binding the sorted and compressed asset files into a new content package; providing the new content package from the server device to the client device over a network according to progress through the virtual environment which is generated at the client device using the asset files; recording an asset list which represents the asset files used to generate the virtual environment at the client device, wherein the asset list comprises a list of the new content packages supplied to the client device; and distinguishing between legitimate and non-legitimate behaviour of the client device in relation to the asset files according to the recorded asset list.

In one example the method includes encrypting the new content package at the server device with a master key; decrypting the new content package at the client device with the master key which is common to the client device and to a plurality of the other client devices; re-encrypting the new content package at the client device with a user-specific key which is unique to the client device; and re-decrypting the new content package at the client device with the user-specific key in response to progress through the virtual environment generated at the client device.

In one example there is described a computer system comprising a server device which provides one or more content packages, wherein each content package comprises a plurality of asset files; a client device which stores the asset files provided in the one or more content packages, and generates a virtual environment based on the asset files to be displayed on a display unit associated with the client device; and a tracker arranged to record an asset list representing a sequence of the asset files according to progress through the virtual environment at the client device, and to distinguish between legitimate and non-legitimate behaviour according to the recorded asset list.

In one example, the content packages are associated with respective sections of the virtual environment, such that progress through the virtual environment involves a plurality of the content packages in sequence.

In one example, the tracker records the asset list comprising the sequence of the content packages.

In one example, each content package is encrypted and is associated with a respective decryption key, and the tracker records the sequence of decryption keys as the asset list.

In one example, each of the content packages comprises a plurality of the asset files having a plurality of different file types and an original file order, wherein the server device packs the asset files in the content package according to their file type, and wherein the client device unpacks the asset files from the content package and stores the asset files of the unpacked content package according to their original file order.

In one example, the server device applies one of a plurality of predetermined compression algorithms to the packed asset files according to their file type, and the client device applies a corresponding decompression algorithm to the asset files according to their file type.

In one example, the server device encrypts the content package with a master encryption key and the client device decrypts the content package with a corresponding master decryption key.

In one example, the client device further encrypts the unpacked content package at the client device with a user-specific encryption key, and decrypts the unpacked content package with a corresponding decryption key in response to progress through the virtual environment at the client device, and wherein the tracker records the asset list comprising a sequence of the decryption keys.

In one example, the tracker analyses the asset list using one or more rules to distinguish between the legitimate and non-legitimate behaviour.

In one example, the tracker detects non-legitimate behaviour by the client device when the sequence does not match any of a plurality of known valid sequences.

In one example, the tracker detects non-legitimate behaviour by the client device when the sequence matches any of a plurality of known invalid sequences.

In one example, the tracker is arranged to take a response action in response to detecting the non-legitimate behaviour.

In one example, the tracker takes the response action which includes any one or more of: an alarm action to notify the server device; an alarm action to notify a user of the client device; an invasive action to restrict progress through the virtual environment; and an invasive action to interrupt generation of the virtual environment at the client device.

In one example, the tracker records the asset list comprising the sequence of the asset files used by the client device to generate the virtual environment in response to progress through the virtual environment at the client device.

In one example, the asset list comprises an identity of each of the asset files in the sequence and the order of the asset files in the sequence.

In one example, the tracker records the asset list according to a sequence of file access requests made at the client device to retrieve the asset files from a storage.

In one example, the tracker comprises a disc access module arranged to intercept system calls made by executing code to retrieve the asset files from a storage into a memory to be processed by a processor to generate the virtual environment at the client device.

In one example, the tracker records the asset list comprising the sequence of the content packages downloaded from the server device to the client device to generate the virtual environment in response to progress through the virtual environment.

In one example, the tracker is provided on the client device.

In one example, the tracker is provided on the server device.

In one example, the tracker is distributed between the client device and the server device.

In one example there is described a client device, comprising a storage which stores a plurality of asset files provided in one or more content packages; a processor which generates a virtual environment to be displayed on a display device associated with the client device, wherein the processor generates the virtual environment based on one or more of the plurality of asset files; a tracker arranged to record an asset list which represents the asset files used by the processor depending on progress through the virtual environment at the client device; and wherein the tracker is further arranged to distinguish between legitimate and non-legitimate behaviour of the client device according to the recorded asset list.

In one example, a network interface is arranged to receive a sequence of the content packages from a server device over a network, and the tracker records the asset list comprising a sequence of decryption keys relating to the content packages.

In one example there is described a server device, comprising: a library storage arranged to store a plurality of content packages each comprising a plurality of asset files; a data handling unit configured to supply a sequence of the content packages over a network to a client device which generates a virtual environment using the asset files; and a tracker arranged to record an asset list which represents the asset files according to progress through the virtual environment at the client device; wherein the tracker is further arranged to distinguish between legitimate and non-legitimate behaviour of the client device according to the recorded asset list.

In one example there is described a method of providing content from a server device over a network, comprising: extracting a plurality of asset files from a content package; recording metadata which determines an original order of the asset files within the content package; sorting the asset files by their file type; compressing the asset files using a plurality of different compression algorithms according to their respective file type; binding the sorted and compressed asset files into a new content package; providing the new content package from the server device to a client device over a network according to progress through a virtual environment generated at the client device using the asset files; recording an asset list which represents the asset files used to generate the virtual environment at the client device, wherein the asset list comprises the sequence of content packages supplied to the client device; and distinguishing between legitimate and non-legitimate behaviour of the client device in relation to the assets according to the recorded asset list.

In one example the method includes encrypting the new content package at the server device; and decrypting the new content package at the client device.

In one example the method includes re-encrypting the content package at the client device; and re-decrypting the content package at the client device in response to progress through the virtual environment generated at the client device.

In one example there is described a method of providing content at a client device, comprising: receiving a sequence of content packages comprising asset files, according to progress through a virtual environment generated at the client device using the asset files; unpacking the received content package including decompressing each of the asset files with a decompression algorithm according to their file type and resorting the asset files into an original file order according to metadata provided in the content package; recording an asset list which represents the asset files used to generate the virtual environment at the client device, wherein the asset list comprises the sequence of content packages supplied to the client device; and distinguishing between legitimate and non-legitimate behaviour of the client device in relation to the assets according to the recorded asset list.

In one example the method includes decrypting the content package at the client device.

In one example the method includes re-encrypting the content package at the client device; and re-decrypting the content package at the client device in response to progress through the virtual environment generated at the client device.

In one example there is provided a tangible non-transient computer readable medium having recorded thereon instructions which, when executed, cause a computer to perform the steps of any of the methods defined herein.

BRIEF DESCRIPTION OF THE DRAWINGS

For a better understanding of the invention, and to show how example embodiments may be carried into effect, reference will now be made to the accompanying drawings in which.

DETAILED DESCRIPTION

The example embodiments will be discussed particularly with reference to a video gaming system, for ease of explanation and to give a detailed understanding of one particular area of interest. However, it will be appreciated that other specific implementations will also benefit from the principles and teachings herein. For example, the described embodiments can be applied in relation to tools for entertainment, education, engineering, architectural design or emergency planning. Other examples include systems providing visualisations of the human or animal body for teaching, training or medical assistance. There are many specific environments which will benefit from delivering interactive multimedia content to client devices across a network. Thus, references to a game or video game are intended to refer to example uses of the teachings herein and should be adapted as appropriate for other example implementations.

Figure 1:
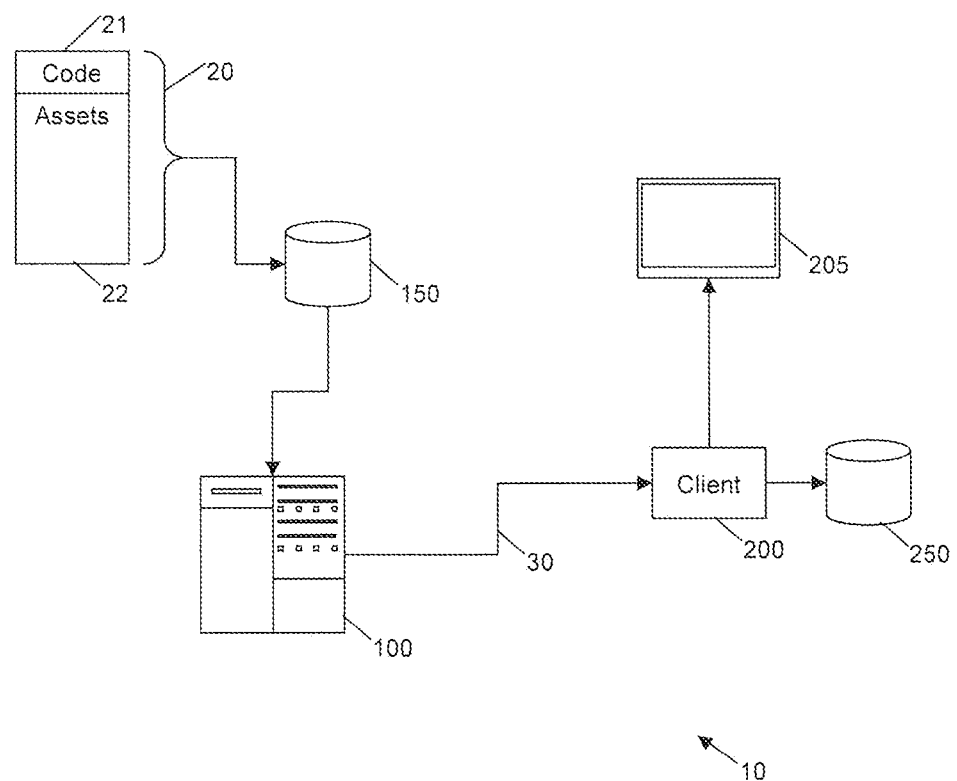
FIG. 1 is a schematic view of an example content delivery system.

FIG. 1 is a schematic diagram of an example system 10 for delivering interactive content, such as a video game. The example content delivery system 10 includes at least one server device 100 and at least one client device 200 which are coupled together by a network 30. The underlying software and hardware components of the server device 100, the client device 200 and the network 30 may take any suitable form, as will be familiar to those skilled in the art.

In one example, the server 100 may take the form of a relatively powerful computer device. The server 100 may comprise one or more processors, a memory (e.g. a solid state random access memory device), a storage device (e.g. a hard disk or other non-volatile storage medium), a network interface (e.g. a network card) and other appropriate components.

The client devices 200 may take a variety of forms, including hand-held cellular phones, PDAs and gaming devices, e.g. Sony PSP®, Nintendo DS®, games consoles such as XBOX®, Wii®, PlayStation®, set-top boxes for televisions, or general purpose computers in various formats (tablet, notebook, laptop, desktop). These diverse client platforms suitably provide local storage, memory and one or more processors. The client devices 200 may contain or be associated with a form of visual display unit 205 such as a display screen or other visual display device (e.g. LCD or LED display panel, touch screen, video goggles or holographic projector).

The network 30 is suitably a wide area network (WAN). The network 30 may include by wired and/or wireless connections. The network 30 may include peer to peer networks, the Internet, cable or satellite TV broadcast networks, or cellular mobile communications networks, amongst others.

In an example embodiment, the server 100 and the client device 200 are arranged to deliver one or more content packages 20 across the network 30. In the following example, data flows flow substantially unidirectionally as a download from the server 100 to the client 200. In other specific implementations, it is possible that the packages 20 are instead uploaded and transmitted from the client 200 to be received by the server 100. In still other examples, the packages 20 are exchanged bidirectionally.

In the following examples, the content packages 20 are transferred electronically across the network 30. However, in other examples, a physical medium may be used to transfer at least some of the data discussed herein. In particular, a system is envisaged in which the server 100 records the content packages 20 onto the physical medium for transfer to the client device 200. The physical medium may take the form of, for example, an optical disk or a solid state memory device (e.g. a flash drive or USB memory stick).

The content package 20, such as a video game, typically includes one or more sections of executable code 21, and a relatively large volume of data assets 22. In a video game, the assets 22 may include many multimedia data files of various types (e.g. 3D object data files, texture image files, and related environmental data or scripts). The assets may also include video cut scenes, 2D image files and audio files. Traditionally, the code 21 and the assets 22 are designed and arranged to be delivered on a physical recording medium such as an optical disc. Given the familiarity of the industry with the optical disc delivery format, it is also convenient to design and deliver new games in these traditional formats. In particular, issues such as quality assurance and security are well understood and highly developed for traditional games packages on physical media. Hence, it is advantageous to be able to maintain the current design and delivery process, but to add a simple and low-cost method for transferring the created original content into a form which is more suitable for digital downloads.

As a further consideration, there is also a large catalogue of legacy content, such as video games, which have already been created and distributed using optical discs or memory cartridges or other physical media. It is relatively difficult and expensive to change these legacy games retrospectively, and thus it is desired to provide a system which enables digital downloads of these games. Repackaging content into a downloadable form has many further advantages for the games industry, in particular to reach new customers or to reach new markets or territories.

In these example embodiments, the client device 200 executes the game code 21 to control an interactive virtual environment that will be represented visually through the local display device 205. The environment will depend upon the nature of the content wherein, as examples, a car racing game will typically provide a racetrack environment, while a first person role play game provides a city environment. The environment is virtual, in that it is produced within the hardware and appears on the display screen. The environment is interactive in that the user may command changes to the environment (e.g. move through virtual space by driving around the racetrack or moving through the city) and/or cause changes in behaviour within the environment (e.g. by fighting with other characters). The commands or actions of the user thus cause a response in the virtual environment, rather than the user being a passive observer.

Suitably, the server 100 provides the game code 21 and the relevant game data 22 to the client 200. Executing the game code 21 causes the client device to access the data assets 22 in relevant combinations, which then enables the client device 200 to output the appropriate visual representation on a display screen 205. In the example gaming system, these visual representations are then typically output in combination with a coordinated audio stream comprising background music and environmental audio (wind, rain), and more specific game-event related audio effects (gunshots, footfalls, engine noise). The interactive environment may be interspersed with previously prepared video sequences (cut scenes) and user interaction points (e.g. menus, maps).

In the example gaming system, user commands at the client device 200 may take the form of movement commands (e.g. walk, run, dive, duck) and/or action commands (e.g. fire, cover, attack, defend, accelerate, brake) that affect the operation of the objects in the virtual environment. Suitably, these user commands control the game locally at the client device 200 and so define the game content being delivered onscreen at the client device 200.

Together, the executable code 21 and the assets 22 form part of the content package 20. A library 150 (e.g. another server, or a network storage device) may be provided to store the or each such package 20 ready to be downloaded by the client device 200. The library 150 may store many different such content packages 20, giving the user a wide choice of games, or other content, to be downloaded.

Figure 2:
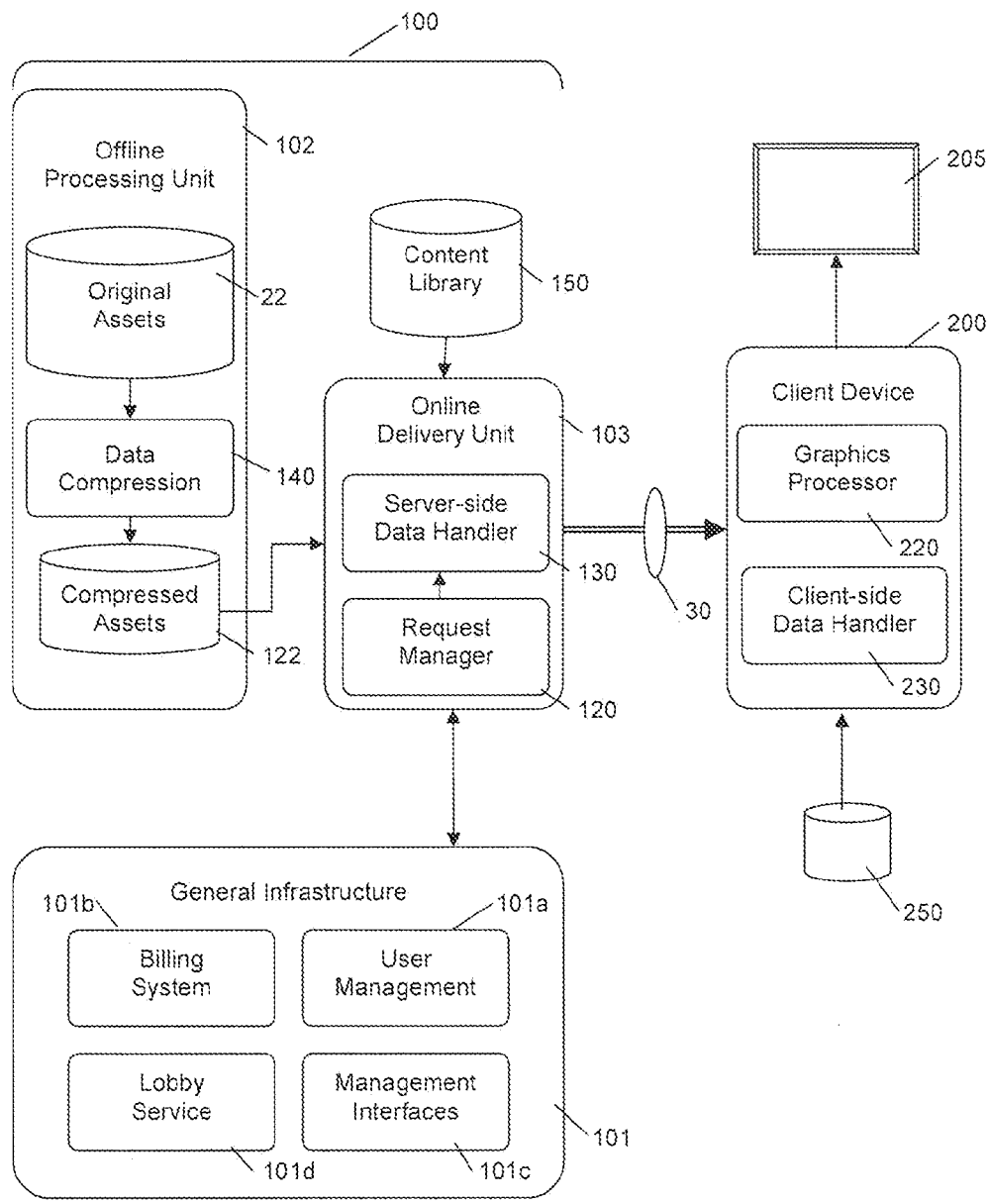
FIG. 2 is a schematic view of the example system in more detail.

FIG. 2 is a schematic diagram showing an example server apparatus 100 in more detail. In this example system architecture, the server 100 may include a general infrastructure unit 101, an offline processing unit 102, and an online delivery unit 103. Optionally, these units may be distributed amongst several physical server devices arranged at physically separate locations or sites. Also, these units may be duplicated or sub-divided according to the needs of a particular practical implementation.

The general infrastructure unit 101 provides support infrastructure to manage the content delivery process. For example, the general infrastructure unit 101 provides modules 101a-101d that manage user accounts including authentication and/or authorisation functions 101a, billing 101b, developer management interfaces 101c, and lobby services 101d that allow users to move around the system to access the available games or other multimedia content.

The online delivery unit 103 suitably includes a request manager module 120 and a server-side data handling module 130. In the example gaming system, the request manager module 120 receives and processes data requests from the client 200, such as a request for a particular content package 20. The data handling module 130 arranges delivery of the content package 20 from the library 150 to the client 200.

In this example, the client 200 includes, amongst other components, a graphics processor 220 and a client-side data handling module 230. Here, the graphics processor 220 takes the graphical data, as received in the content package 20 from the server 200, and/or as received from elsewhere, and performs graphics processing to render a sequence of visual image frames capable of being displayed on a visual output device coupled to the client 200. These frames may be 2D image frames, or 3D image frames, depending on the nature of the display device 205. The client-side data handler 230 connects with the server-side data handler 130 to transfer the content package 20 and optionally to exchange other data as well.

In one example, the server 100 receives the data assets 22 in their original format as might be provided by a games publisher for a traditional format appropriate to distribution on physical media such as optical disks. However, these original assets are relatively large and can take a long time to download over the network 30. Therefore, the example embodiments may further include an improved mechanism for changing the original assets into a compressed format. These compressed assets 122 are then included in the downloadable package 20, and are decompressed by the client 200, i.e. from the compressed format back to the original format, ready to be called by the executing game code 21.

As shown in FIG. 2, the offline processing unit 102 may include a data compression unit 140 that advantageously transforms the original assets 22, such as complex 3D objects, texture images, audio files and others, into their corresponding compressed format 122, which can then be included in the respective download package 20 in the library 150.

The data compression unit 140 suitably operates statically, in advance, so that a set of compressed assets becomes available in the transformed format. As one option, a games developer may supply raw asset files, such as 3D objects, in a native high-resolution format such as a detailed polygon mesh. The raw assets may also include texture files (image files) which provide surface texture and detail over the polygon meshes. These objects represent, for example, characters or components of the game such as humans, animals, creatures, weapons, tables, chairs, stairs, rocks, pathways, etc. The data compression unit 140 then transforms the received objects into the compressed format and provides the compressed assets 122 to be used later.

A corresponding decompression unit may be provided at the client device 200, e.g. as part of the client-side data handler 230. The compressed assets are decompressed at the client device 200 and delivered in a suitable format to the graphics processor unit 220. Typically, the compressed assets are returned to their original format, but it is also possible to perform a format conversion. For example, an original bitmap image is compressed using partial differential equations (PDEs) into the compressed format, and a JPEG type image file is restored from the PDE compressed format, on the basis that the graphics processor 220 is able to accept the .jpg image file as a substitute for the original .bmp asset.

An example mechanism to compress assets using partial differential equations is discussed in detail in WO2011/110855 entitled MULTIMEDIA CONTENT DELIVERY SYSTEM, the entire content of which is incorporated herein by reference.

Figure 3:
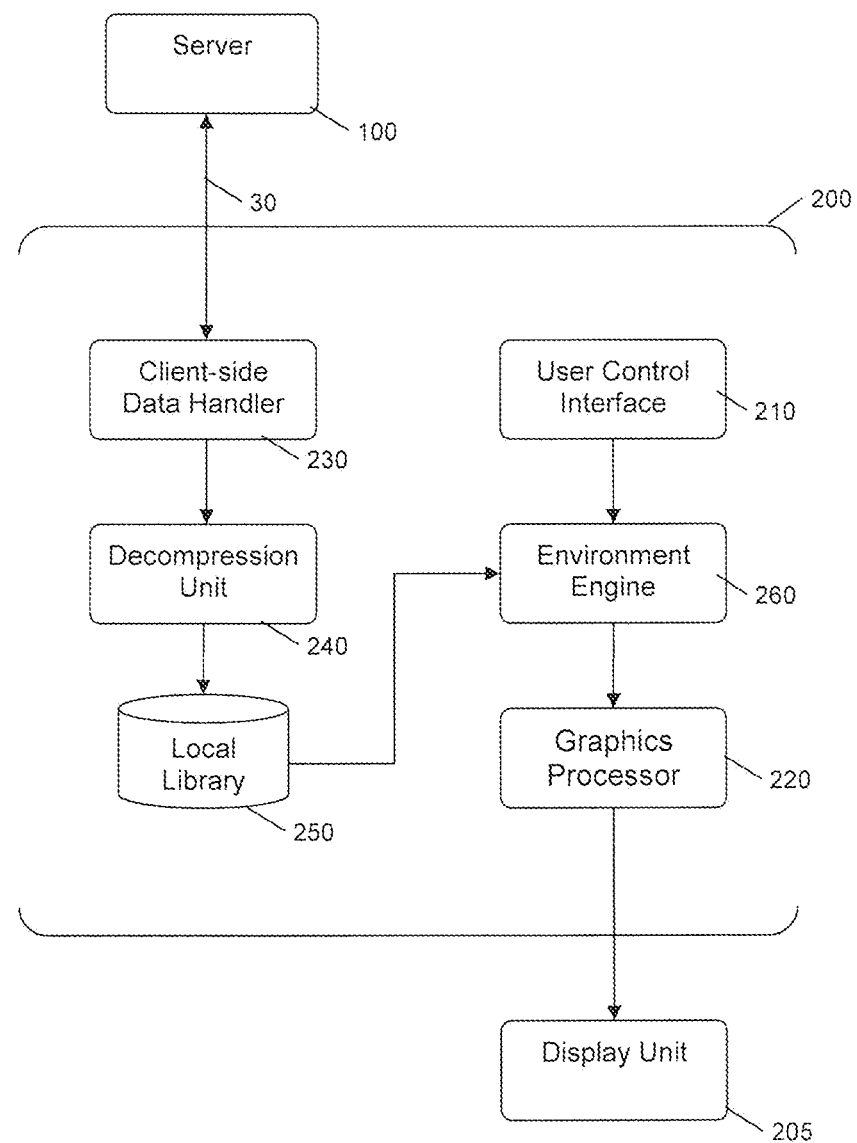
FIG. 3 is a schematic view of an example client device.

FIG. 3 is a schematic diagram showing the example client device 200 in more detail. As discussed above, the client device 200 suitably includes a processor unit 220 which performs graphics processing (e.g. a GPU), a client-side data handling module 230, and a decompression unit 240. The data handler 230 handles network traffic to and from the server 100, including requesting data from the server 100 as required by the client device 200. The data handler suitably executes as software on the processor of the client device 200 and is coupled to appropriate interface hardware, such as a network interface card (NIC). The received data suitably includes the content packages 20 as described herein, which are downloaded and stored in a local storage device, e.g. in a relatively permanent local library and/or a temporary cache 250. The decompression unit 240 may decompress the downloaded data, where appropriate. Suitably, the stored assets 22 are retrieved from the cache or library 250 when needed, i.e. when these objects will appear in a frame or scene that is to be rendered at the client device 200.

The client device 200 comprises a client-side environment engine 260. Suitably, this environment engine 260 controls the graphical virtual environment in response to inputs from a user of the client device via one or more user control interface devices 210 (e.g. keyboard, mouse, remote controller, camera, microphone). In the example gaming system, the environment engine module 260 may be implemented by the downloaded application code 21 executing locally on a processor of the client device 200 to provide a game that is displayed to the user via the display device 205.

Figure 4:
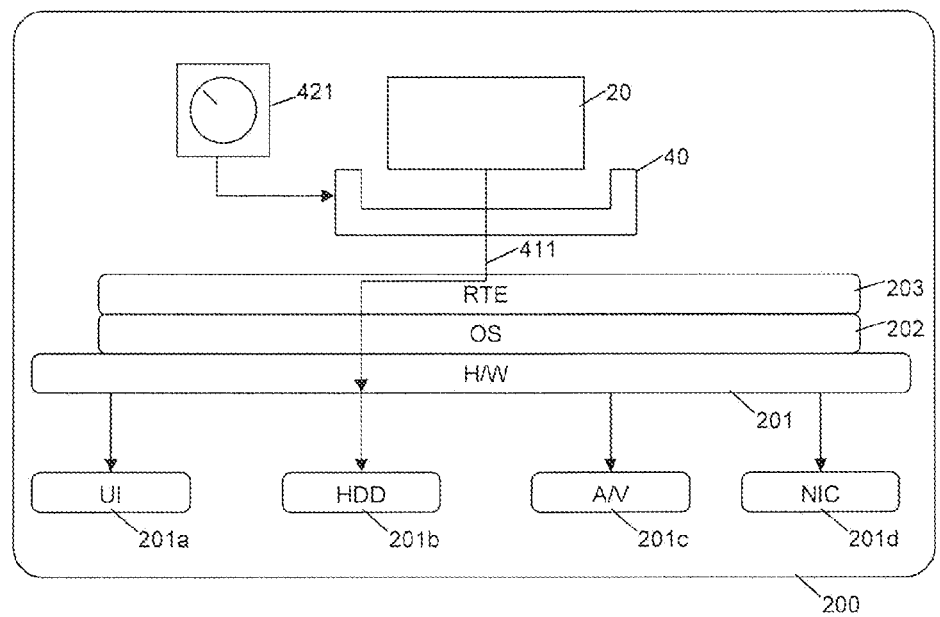
FIG. 4 is schematic view of the example client device in more detail.

FIG. 4 shows another example embodiment of the client device 200 in more detail. Here, the client device 200 includes physical hardware H/W 201, an operating system OS 202 and a runtime environment RTE 203 for executing the downloaded content. A content package 20 is downloaded from the server 100 in combination with a wrapper component 40. The wrapper component 40 provides an intermediate layer between the downloaded game package 20 and the runtime environment 203. In one example, the wrapper component 40 may comprise executable software instructions which, when executed, control the client device 200 in the manner described herein.

In this example, the hardware layer 201 suitably includes the user input devices 201a, such as keyboard, mouse, game pad etc., local storage devices 201b such as a hard disk drive HDD, audio/video A/V output devices 201c such as a sound card or video card to reach a monitor and speakers, and network interface connections NIC 201d to reach external network locations. The NIC 201d suitably allows the client device 200 to connect with the game delivery server 100 over the network 30.

During execution, the game package 20 will make system calls 411 through the runtime environment 203 via the operating system 202 to reach the physical hardware 201. The wrapper 40 suitably hooks one or more of these system calls 411, e.g. by hooking calls made through an application programming interface (API). As a result, the wrapper 40 is able to restrict the functionality of the downloaded game package 20. In one example, the wrapper may include one or more dynamic linked libraries (DLLs) which are installed on the client device. The DLLs may impose an intermediate layer between the executable code and the runtime environment 203, and particularly between the executable code and the operating system 202.

In one example, the wrapper 40 does not substantially interfere with playability of the game, by quickly and transparently passing legitimate calls 411 through to the OS 202 to reach the hardware layer 201. The legitimate system calls are calls of a type or nature which are to be ignored by the wrapper 40, or which the wrapper 40 has intercepted but determines not to intervene. The wrapper 40 enables a demo mode, or first mode of restricted functionality, wherein the user may experience and enjoy the interactive virtual environment provided by the content package 20 with limits or restrictions which are imposed by the wrapper 40. At a later point in time, the wrapper 40 may instead be changed so that the demo mode is instead changed to a full mode. In the full mode, the wrapper 40 removes the restrictions which applied in the demo mode, so that the user is now able to access more of the interactive environment than previously.

The download wrapper 40 suitably includes one or more cut off controls 421 which impose restrictions by the wrapper 40 onto the game package 20. For example, the controls 421 define that the user is allowed to play the game package for a limited time period, such as 7 days or 30 days. In this way, the game content may be released to the client device with a rental system having a time restriction. As another example, the user is able to play the game in the demo mode a limited number of times, as a quantity restriction. Many other specific implementations will be apparent to the skilled person, such as restricting the 'demo' mode to the first few levels of a multi-level game, restricting the user's choice of player character or locations in the game, and so forth. The wrapper 40 then implements these restrictions so that execution of the game package 20 is controlled.

In one example, the wrapper 40 controls any one or more of: file input/output, user inputs, screen activity and network activity, such that the functionality of the game is restricted for users who have not yet purchased the game. That is, in the demo mode, the wrapper 40 restricts the functionality of the downloaded game package 20, by restricting the ability of the executable code 21 to interact with the hardware of the client device 200.

In one example, the wrapper 40 may be completely uninstalled from the client device when the user purchases the full game, thus leaving the original game package 20 to run natively on the client device 200 without any further interference from the wrapper 40. That is, in the demo mode, the wrapper 40 actively interferes with the ability of the game package 20 to execute fully on the client device 200. Meanwhile, in the full mode, the wrapper 40 does not interfere at all, by becoming passive or inoperative, thus giving the game package 20 unfettered access to the client device 200.

Figure 5:
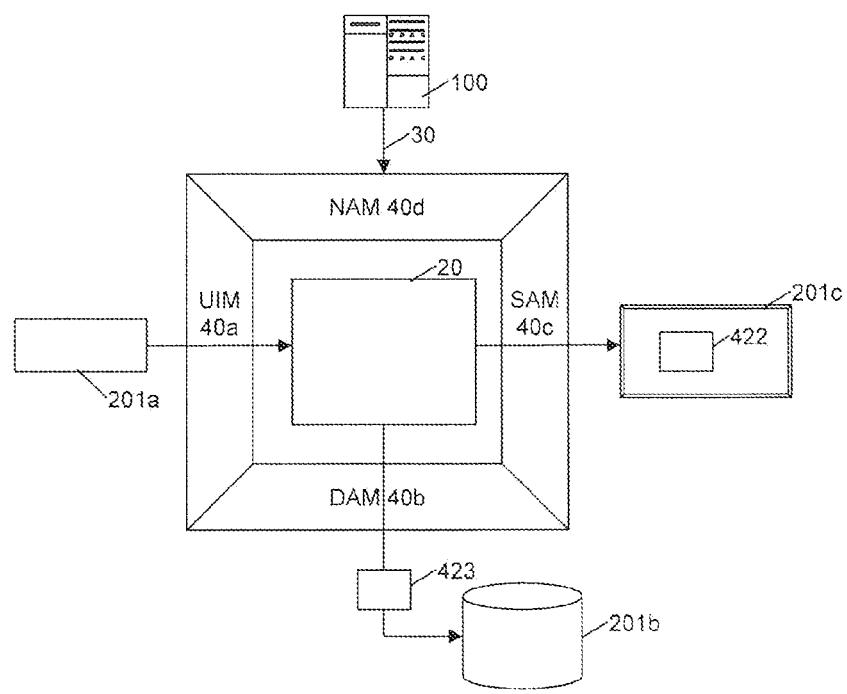
FIG. 5 is another schematic view of the example client device in more detail.

FIG. 5 is a schematic diagram showing the client device 200 in more detail. In this example, the wrapper 40 includes one or more of a user input module UIM 40a, a disc access module DAM 40b, a screen access module SAM 40c and a network access module NAM 40d.

The user input module UIM 40a intercepts input signals from the user input devices 201a. As noted above, the user input devices 201a suitably include any one or more of a keyboard, mouse, graphics pad, handheld-controller, touch sensor, motion sensor, face recognition unit, gesture recognition unit and so on. In use, the UIM 40a may intercept all, or some, of the user input signals at appropriate times during execution of the game code 21. As a result, the wrapper 40 is able to determine whether or not each user input signal is provided to the game code 21 by the execution environment 203. For example, the wrapper 40 may choose to disable an important key on a keypad (e.g. making the 'up' key unresponsive) thus controlling what the user is able to do with the game package 20. It will be appreciated that this ability to interfere with the user input signals provides a very effective mechanism to control the virtual environment in the demo mode. Many different specific implementations can be envisaged depending upon the nature of the content (e.g. what type of game is being played) and the desired effect on the user.

The disc access module DAM 40b restricts access to the local storage 201b. In the example embodiments, the DAM 40b may be arranged to satisfy demands for individual ones, or groups, of the game assets 22 as requested by the game code 21. For example, the wrapper 40 is thus able to examine a request by the game code 21 for a particular asset file name, and determine whether or not to allow the client device 200 to satisfy the request. In this way, the wrapper effectively controls access by the executing game code 21 to the relevant game assets 22.

The DAM 40b of the wrapper 40 may further enable a dynamic asset streaming mechanism, wherein at least some of the game assets 22 are streamed to the client device 200 while the game is being played. Even though the game code 21 did not originally allow for asset streaming, this asset streaming function may be provided transparently by the wrapper 40 instead. Advantageously, the wrapper 40 interacts with the server 100 to receive a stream of the game assets 22 into the local asset cache 250, e.g. stored on the hard disk drive HDD 201b. A requested file is satisfied from the cache by the wrapper 40, rather than from an original local location as expected by the game code 21.

The DAM 40b also enables asset compression using alternate compression mechanisms. That is, the game assets 22 may be delivered in a highly compressed form and then decompressed prior to being provided to the game 20 via the DAM 40b.

The DAM 40b may also enable digital rights management (DRM), by restricting access from the game code 21 to one or more relevant game assets 22. For example, the DRM restricts access to graphic assets associated with particular player characters while in the demo mode. These assets are then unlocked in the full mode, such as by being transferred from a secure cache held by the wrapper 40 into the original storage location known to the game code 21 (e.g. by being copied into a directory associated with the game code 21).

The network access module NAM 40d intercepts and constrains network access by the game 20. Further the NAM 40d allows the wrapper 40 to access remote resources across the network 30. In particular, the example embodiments require continuous network access to the server 100 while in the demo mode and the NAM 40d monitors for presence of connection with the server 100. Suitably, the NAM 40d monitors a periodic 'heartbeat' signal which confirms validity of the connection. Where the connection is terminated (e.g. inactive for longer than a predetermined period), then the wrapper 40 may immediately terminate the demo session of this game. As another example, the NAM 40d restricts network access while in the demo mode so that the client device 200 is only able to access a defined set of network locations (e.g. a defined set of IP addresses).

The screen access module SAM 40c intercepts outputs from the game 20 toward one or more audio-video output devices 201c. For example, the SAM 40c intercepts a frame buffer which provides video signals via a video card. The game code 21 will typically write to the frame buffer with updated video information, thus allowing each frame of the video output to be displayed on the display screen. The wrapper 40 is suitably arranged to control the flow of information into or out of the frame buffer, thus restricting the ability of the game code 21 to display intended images to the display screen.

In one example embodiment, the SAM 40c allows overlay presentations 422 to be added to the video output, thus presenting additional visible information on the screen 201c for the user. For example, the wrapper 40 displays one or more overlay objects 422 on the display screen via the SAM 40c for the purpose of offering the full version of the game, for advertising other products, or otherwise. The user input signals may be disabled or restricted by the UIM 40a while the offer is made.

The overlay objects 422 may be delivered from the server 100 across the network 30. The graphic messages may be derived from a profile of the player, e.g. built from prior game play or prior web activity. The graphic messages 422 include, for example, video sequences of the features in the full game, images of locations not yet reached in the full game, incentives to purchase, general advertising and so on.

In one example, the game code 21 may store one or more items of game progress information 423 onto the local storage 201b. The DAM 40b may observe the game progress information 423, analyse this information, and update the player profile accordingly, thus further tailoring the delivered messages 422.

The example embodiments allow the player profiles to be aggregated across a wide range of players, thus determining composite profiles which inform the likely purchase behaviour of a particular user at the particular device 200. Again, the delivered graphical messages 422 may be controlled by the wrapper 40 according to the composite user profiles.

The game progress information 423 may be diverted into a location controlled by the wrapper 40 and thus is only accessible via the wrapper 40. The game progress information 423 is thus rendered inoperative unless the wrapper 40 is present to permit further progress on the game. As another example, the game progress information 423 may be diverted by the DAM 40b and stored instead on the server 100, rather than in the local storage 201b, thus further enabling control by the wrapper 40. However, in the full mode, the game progress information 423 is instead made available locally on the client device 20 in the expected native format.

Figure 6:
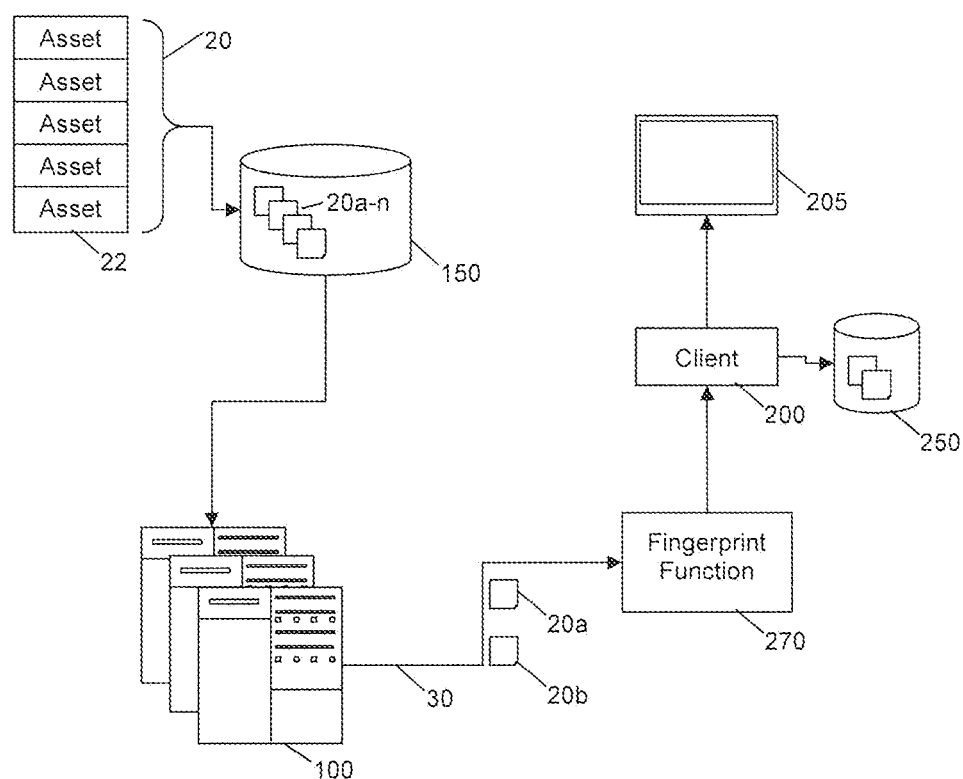
FIG. 6 is schematic view of an example fingerprinting function.

FIG. 6 is a schematic view of an asset fingerprinting function provided by the system. In one example, a tracker (or fingerprint module) 270 is configured to provide the fingerprinting function by directly or indirectly tracking the asset files 22 used by the client device 200. In one example, the tracker 270 tracks the individual asset files 22 themselves, based on an identity of those files such as a file name. In another example, the tracking or fingerprinting unit 270 tracks the content packages 20 containing the asset files 22.

In one example, the tracker 270 may operate locally on the client device 200. In another example, the tracker 270 may operate remotely on the server 100. The server 100 may receive information from the client device 200 and then implement the tracking and fingerprinting function using the received information. In a further example, the tracker 270 may be functionally distributed between the server 100 and the client device 200. In one example, the tracker 270 may be implemented in software executing on the server 100 or the client device 200, as appropriate. In another example, the tracker 270 may be implemented as a dedicated hardware device which is coupled to the server 100 and/or to the client 200, as appropriate.

In one example, the tracker 270 may analyse an asset list 272 to determine whether or not the observed behaviour is considered to be legitimate. For example, the tracker 270 may compare the asset list 272 against rules or criteria which distinguish between legitimate and non-legitimate behaviour.

In one example, tracker 270 intercepts file access requests made by the executing game code 21. Here, the tracker 270 may makes use of the DAM 40b as discussed above. These file access requests are recorded by the tracker 270 in an asset list 272. Recording these file access requests thus constructs an asset list 272 containing or representing the sequence or order of the assets 22 called into memory from the local storage 250 by the executing code 21. Notably, the asset list 272 is responsive to the user's interaction with the virtual environment in this particular session.

When legitimate behaviour is observed, the user is allowed to continue enjoying the content. However, upon detecting non-legitimate or unusual behaviour, the tracker may take an appropriate responsive action. For example, the tracker 270 may take an alarm action, such as raising an alarm with the server 100 and/or notifying the user of the client device 200. The tracker 270 may take an invasive action to interrupt or disrupt use of the content by the user on the client device, such as terminating the current session or restricting the activities or sections which remain available to the user. The user may be notified of the interruption or restriction and an unlocking mechanism may be provided in order to reverse the invasive action when appropriate, such as by the manual intervention of an operator at the server 100 or after a predetermined lock-out period.

Interestingly, there is a relationship between the progress through the content packages 20 by the user and the assets 22 which are read from the library 250 by the executing game code 21. For example, a certain asset might only be used in an early section of the game, or may only be used in some other predictable section. Such assets thus become signature assets which are useful to identify a mode of behaviour of content on the client device, and particularly to flag or identify actual or suspected non-legitimate behaviour. Similarly, certain assets may definitely not be used ordinarily in early sections of the content or within some other specifically known part of the content, and thus become signature assets if they are observed in relation to those sections.

In one example, the tracker 270 compares the observed asset list 272 against one or more known valid sequences and/or against one or more known invalid sequences. The known valid sequences may be obtained by test uses of the content, or by aggregating uses of the content in the field by a large body of real users. An unusual or undesired behaviour pattern of the client device 200 is readily detected when the observed asset list 272 does not match against any of the known valid sequences. Conversely, the known invalid sequences may be compared against the observed asset list to identify the non-legitimate behaviour.

Figure 7A:
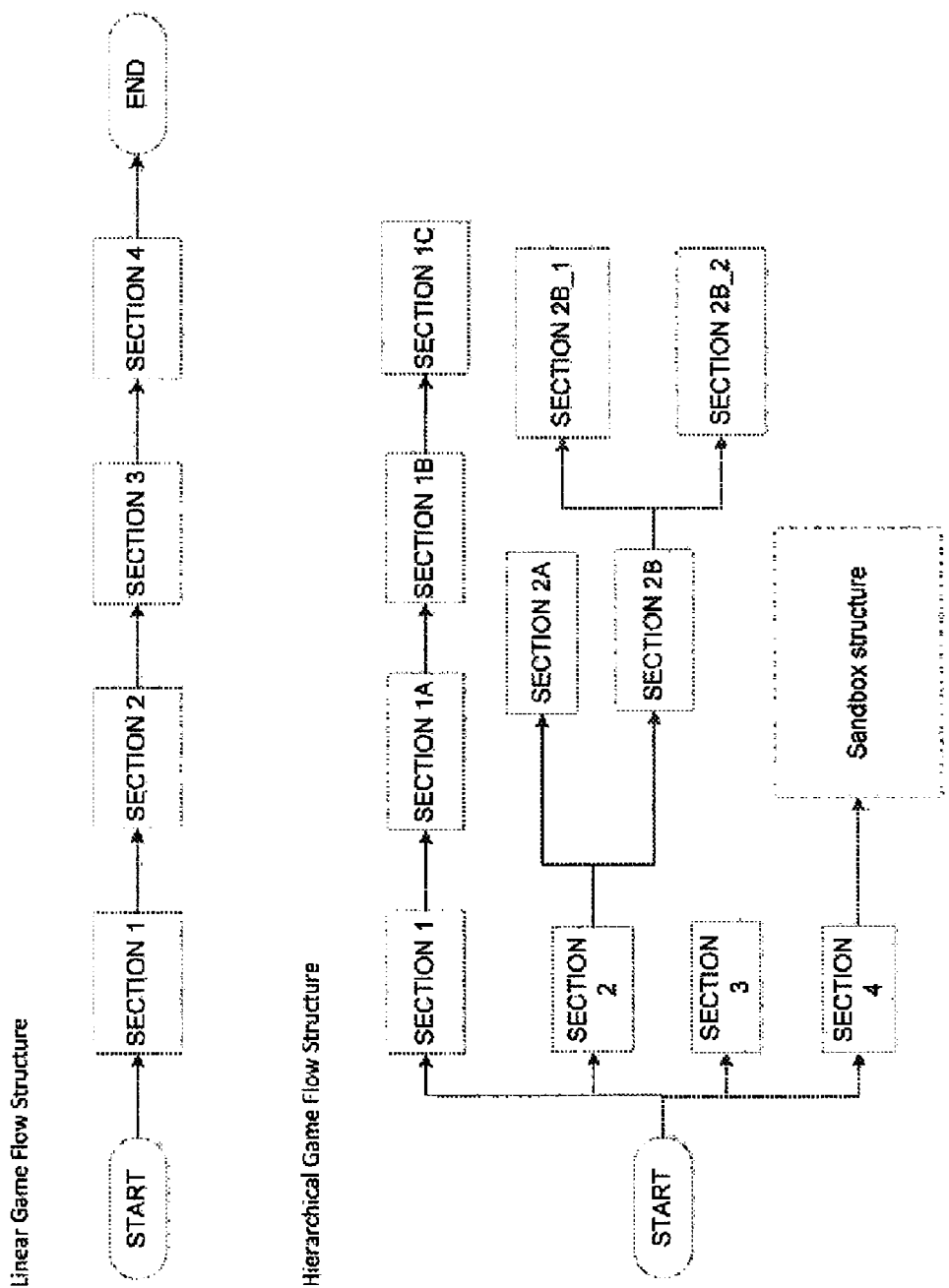
FIGS. 7A-7B are schematic views of example content structures.
Figure 7B:
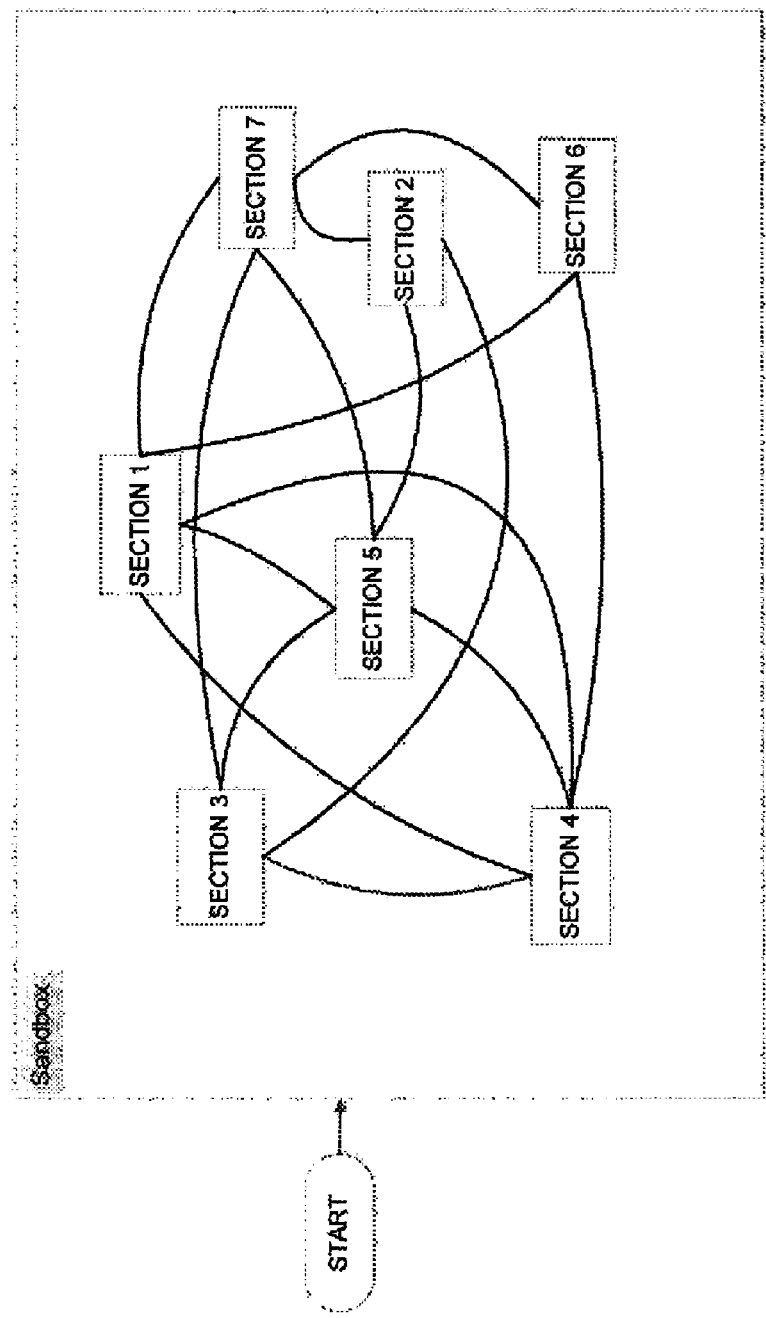

FIGS. 7A-7B are schematic views of some commonly experienced content structures. In a first example, the content is linearly structured and proceeds through a series of sections in a fixed order. In a second example, the content has a hierarchical structure wherein sections of the content are offered with a limited number of options. In a third example, the content may have an open-ended or unconstrained structure allowing the user to traverse the structure, which is also known as a sandbox structure.

Many games provide the user with an open world or sandbox structure in which they can play the game. In this game structure, the user might follow any of a multitude of paths, with sections of content then being encountered in any of many different possible orders. Other types of games follow a hierarchical or graph based structure, whereby completing an element of the game will open up several paths that the user can then go down. In this game structure, the user will have a select group of paths to follow, and sections of content will be limited to this set of paths. Within individual sections of a hierarchical structure, the game might then follow a linear, hierarchical or sandbox structure.

Figure 8:
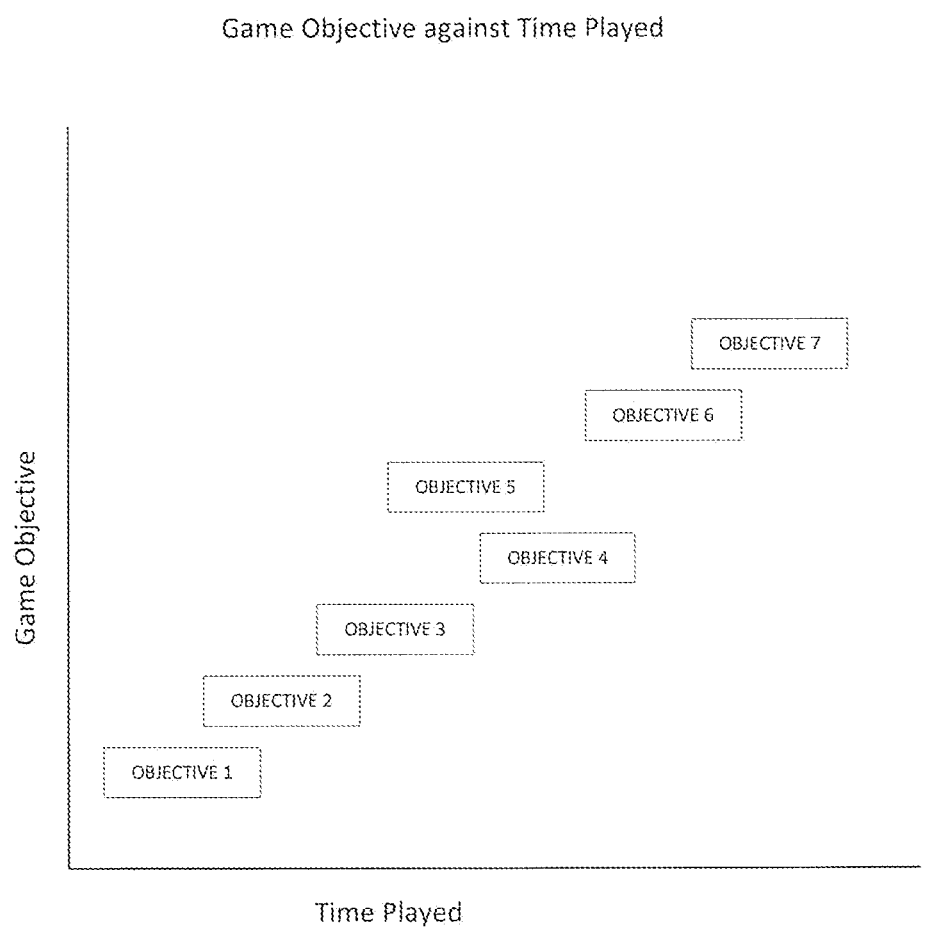
FIG. 8 is a graph of example objectives over time within a content.

FIG. 8 is a graph representing encounters with certain sections of content over time. Typically, a game will involve a number of objectives, and each objective is associated with one or more corresponding sections of content. Typically, certain game objectives will need to be completed in order to proceed further within the game structure, and hence the objectives tend to occur in very specific sections of the game. For any particular player, these objectives tend to follow a linear order over time, similar to the graph shown. It is quite feasible that the order of the objectives may not be truly linear (e.g. Objective 5 can be achieved before Objective 4), but the combination of the game structure and the game objectives interestingly provides a means of tracking the progress of a user in the game.

The tracker 270 suitably employs this analysis of the structure and objectives embodied in the content when determining the validity of the observed asset request list 272. For example, if a user is playing a sandbox game and they request the asset data relating to an objective prior to requesting the data relating to the section in which that objective can be achieved, then it is likely that they are trying to hack or circumvent the system.

The initial set of valid data request sequences may be seeded by means of "test" users playing through the game 20, and recording the data order 272. This initial set of valid asset sequences may then be tuned and refined in real time as actual users play the game, in order to give an accurate prediction for legitimate or non-legitimate behaviour.

Figure 9:
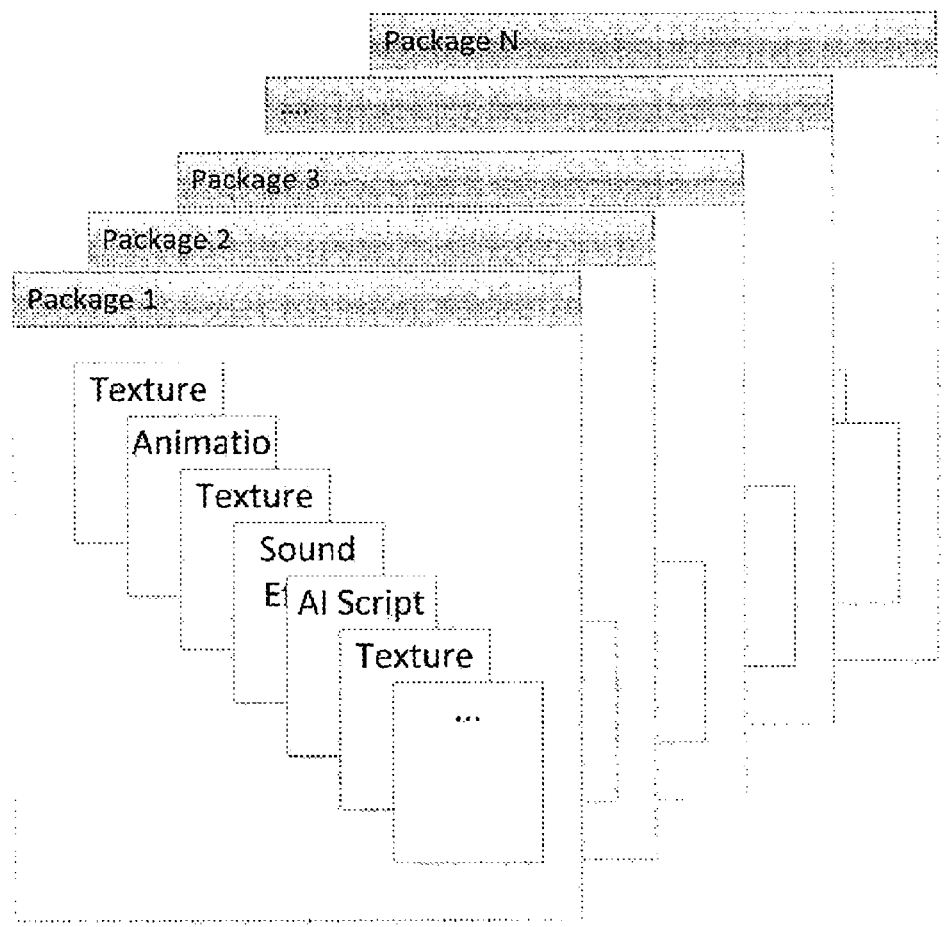
FIG. 9 is a schematic view of example asset packages.

FIG. 9 is a schematic view of example game content which is divided into a plurality of individual content packages 20a-20n. Each package comprises a plurality of asset files 22 which have a plurality of file types. As described above, a game will typically contain a variety of asset types such as textures, geometry, music, sound effects, video, animation, artificial intelligence scripts, etc. These assets are usually packaged up together in a way that is appropriate to the game being played. Generally, this will involve a mixture of different asset types being packaged together to make them more convenient to load into memory during gameplay.

Figure 10:
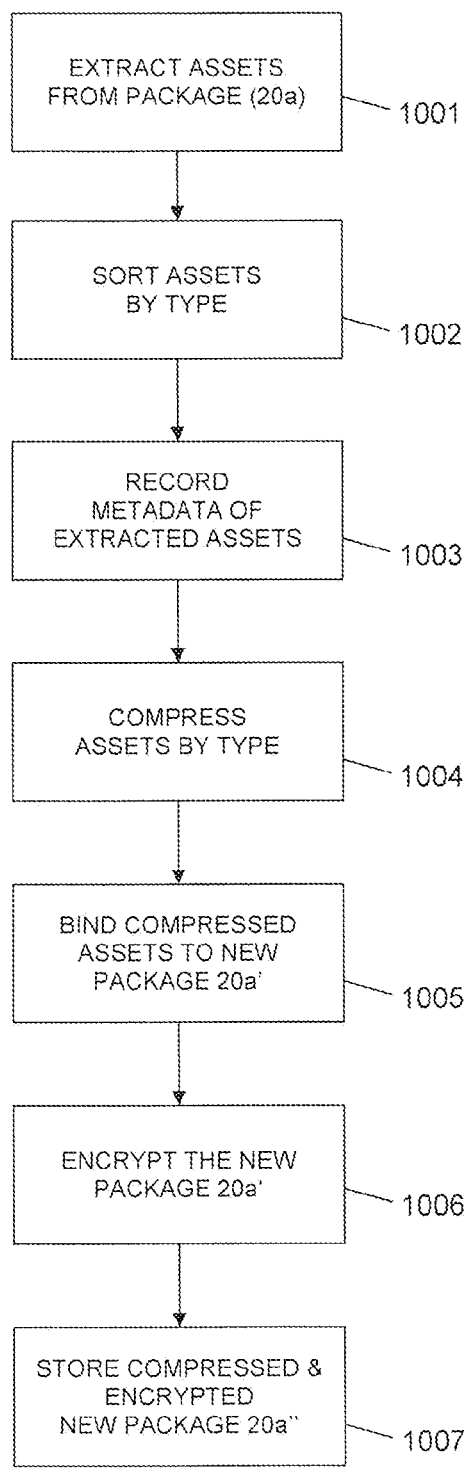
FIG. 10 is a flowchart of an example method.

FIG. 10 is a flow diagram illustrating an example packing process as performed at the server 100. The packing process may be performed within the offline processing unit 102, such as by the compression unit 140.

At step 1001, the original asset files 22 are extracted from their respective original package 20a. At step 1002, the extracted asset files are sorted by their respective asset type, thus grouping together similar types of asset files. At step 1003, an inventory is recorded as metadata relating to the original package 20, such as recording the correct positioning of each asset file within the package (e.g. the relevant folder in an original directory structure). At step 1004, each group of asset files is compressed by a compression technique which is most appropriate for that particular type of asset file. For example, music files are compressed by a first audio compression algorithm, while speech audio files are compressed by a second audio compression algorithm, and so on. At step 1005, the compressed asset files 122 are now bound into a new compressed package 20a', together with the relevant metadata.

In one example, the compressed package 20a is encrypted at step 1006. The encryption may use a master key. The compressed and/or encrypted package 20a'' is stored at step 1007. The package 20a'' may be placed in the library 150 ready for delivery to the client device 200. A reverse process takes place at the client device 200. In one example, the unpacking and installation process may be performed by the decompression unit 240.

Figure 11:
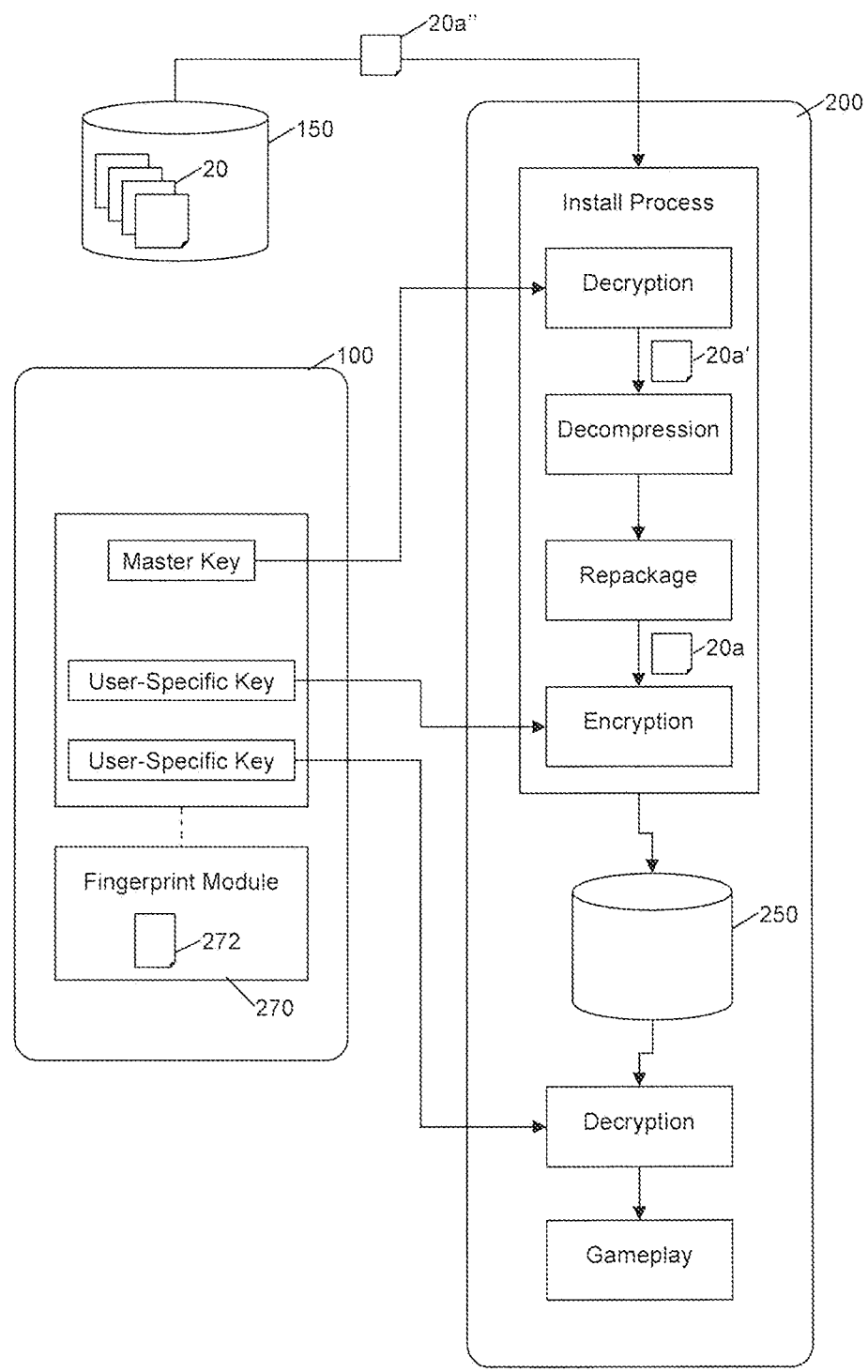
FIG. 11 is a schematic view of the system with encryption and decryption.

FIG. 11 is a further schematic view of the example system. In the unpacking and installation process, the received package 20'' is decrypted where appropriate, suitably by using the counterpart to the master key. The master decryption key may be supplied to the client device 200 by a key store on an appropriate server 100. The package 20a' is decompressed by applying appropriate decompression algorithms for each type of compressed asset. The restored original assets may be rearranged back into the format of the original package 20a by consulting the provided metadata.

Conveniently the same master key may be provided to each client device 200 in the system and the same master key decryption may be used by any of them. However, security is maintained because the decompression and reformatting process still obscures the original data format. The package 20a may be encrypted again at the client device 200, this time with an encryption key which is unique to the client device 200. The corresponding decryption key is likewise unique to the client device 200. Further, the decryption key may be unique to the package 20a. Thus, each package which is installed at the client device 200 requires a decryption key which is unique to that package and to that client device. These decryption keys are suitably provided by the key delivery server 100 during use of the content on the client device 200. In other words, the server 100 may supply the decryption keys to the client device 200 dynamically during use of the content. The server 100 may supply a sequence of such decryption keys, appropriate to each package 20, as the user progresses through subsequent sections of the content.

In one example, the tracker 270 records a decryption key list as the asset request list 272. Thus, the client device 200 may in use request each key from the server 100, such as by using the wrapper component 40 discussed above. The tracker 270 operating on the client device 200 and/or on the server 100 records the observed sequence of key requests as the asset list 272.

As noted above, the server 100 may monitor this sequence of key requests in order to determine whether or not to continue authorising use of the content on the client device 200, and whether or not to release further keys in response to the received key requests.

In one example, the server 100 maintains a model which is constructed by observing a population of other client devices which have each played the same content, i.e. a population of devices who have all played the same game. The model thus captures a statistical representation of previous experiences, based on the observed requests. The tracker 270 then consults this model to determine the legitimacy of a current request. In one example, the tracker 270 is configured to calculate and then update a current score in relation to the current session of interest for this particular client device 200. When the current score breaches a predetermined legitimacy threshold then appropriate action can be taken, such as excluding the client device 200 from further participation in the system.

In one example, the requests are recorded at the client device 200 during a particular session or time period and then uploaded back to the server 100. The server 100 may collate these recorded results for the population of client devices 200, in order to build and refine the statistical model. In some examples, this model then has the dual function of both predicting likely future key requests, and establishing legitimacy.

In this example, the client device 200 does not permanently retain the keys, but instead makes secure requests to the server 100 from time to time to obtain the appropriate keys. In one example, the key requests are made on a regular periodic basis, so as to improve workload efficiency. The keys may be temporarily stored by the client device 200 such as in a key cache.

In one example, the system may further be configured to allow urgent or high-priority key requests, such as in response to execution of the content on the client device 200 requiring a particular key prior to the next scheduled delivery. A key request to the server may contain an identification of a particular file to which the game needs access, as a priority request. For example, the game may be in danger of malfunction as a result of that file not being obtained. In this case the request is logged and a simplified authorisation check may be applied to ensure a speedy response. As time goes on such priority requests would be expected to diminish and be replaced almost entirely with routine requests for new keys which are then entirely supplied by anticipation using the model. However, in order that the model becomes refined as quickly as possible, such priority requests may be given enhanced weighting in the statistical model.

In one example, the content such as a video game includes game achievements which are awarded to the user in response to achieving certain objectives within the game. For example, in a driving game an achievement is awarded for winning 10 races, and another achievement for winning 100 races. In a role-play game the achievements may be based on killing a number of opponents or collecting a number of objects. Thus it can be appreciated that the achievements are typically incremental in nature. In some examples, the model may be further enhanced by also considering a flow of game achievements on a particular client device 200, which should follow a predictable incremental pattern.

Figure 12:
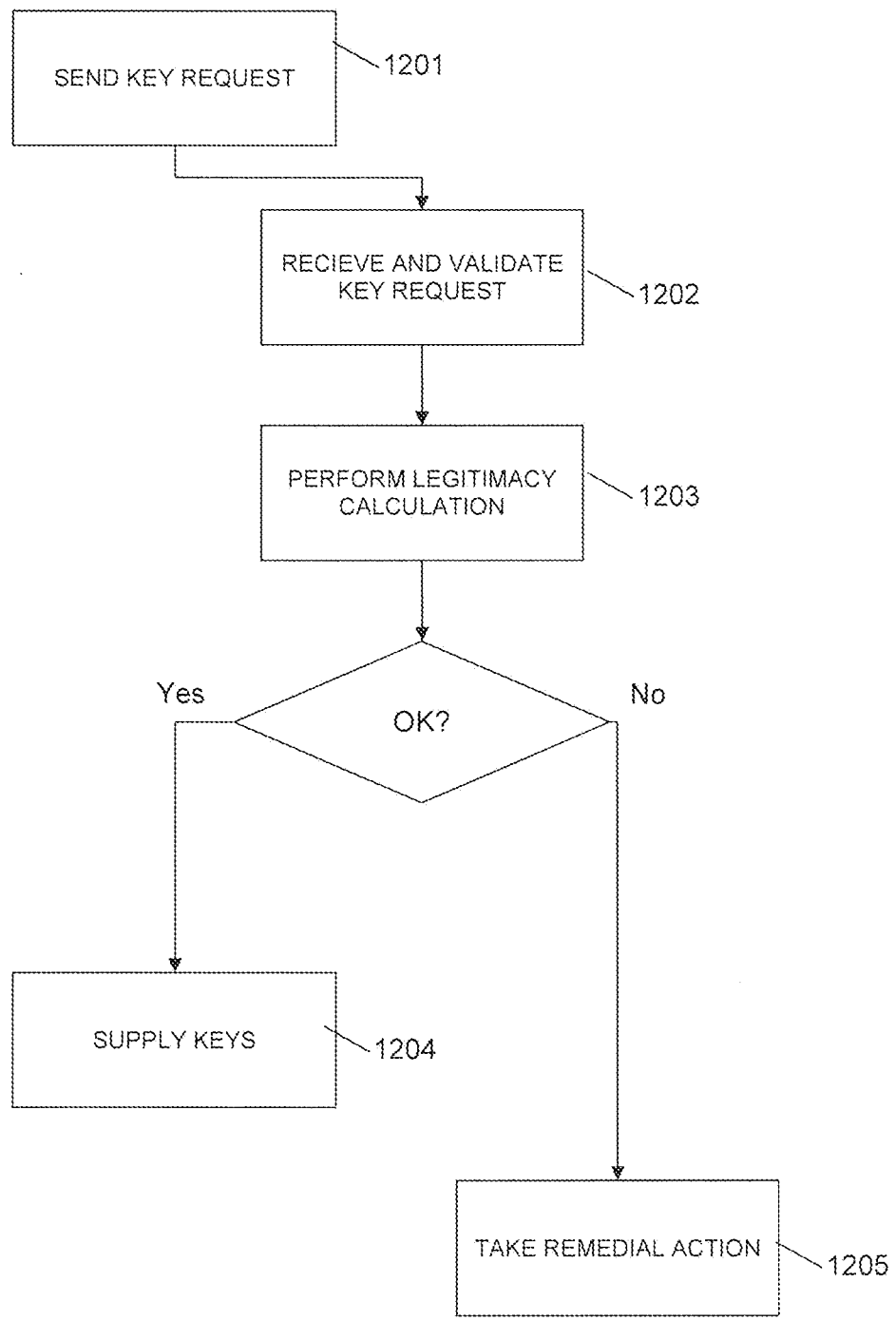
FIG. 12 is a flowchart of an example method for use in controlling access to content.

FIG. 12 is a flowchart of an example method of controlling access to files by the client device 200. At step 1201, the client device 200 sends a key request in relation to one or more content files, so that the client device may access those content files. At step 1202 the server 100 receives the key request and may perform a validation of the request, such as confirming that the client device 200 is authorised to make key requests, and that the user has permission to continue access (e.g. has a temporal or monetary credit in their account to continue playing a particular game or content). The server 100 may perform an inspection of the network connection with the client device 200, to confirm that the connection is secure and not considered high-risk.

At step 1203, the tracker 270, here operating on or with the server 100, performs a legitimacy calculation concerning the current key request. In one example, each key request may contain a request for one or more keys, which in turn relate to one or more asset files, or content packages, as discussed above. The number of keys requested in a particular key request may be taken as a factor by the server 100. That is, a request for a large number of keys would be unusual and may itself indicate illegitimate behaviour. The legitimacy decision may involve calculating a probability that the current request is legitimate. The calculation may be iterative, taking account of previous key requests made by this particular client device. The server determines whether to supply the requested keys in response to a positive determination of the key request at step 1204, or else withhold the keys and take remedial action in step 1205.

In one example, the probability of a legitimate request (p_rl) may be represented by the equation:

$$p\_rl = \text{CumulativeNormalDist}(t\_n, \text{mean}, \sigma) \quad \text{(Eq. 1)}$$

wherein t_n is a normalised request time, based on the observed population.

Over hundreds or thousands of individual requests, the probability trends to zero through the multiplication of lots of calculated probabilities just below 1, therefore in one example each probability is offset before being multiplied, to calculate a probability (p_sl) that the current session is legitimate:

$$p\_sl = \min(\Pi(p\_rl+0.01), 1) \quad \text{(Eq. 2)}$$

Figure 13:
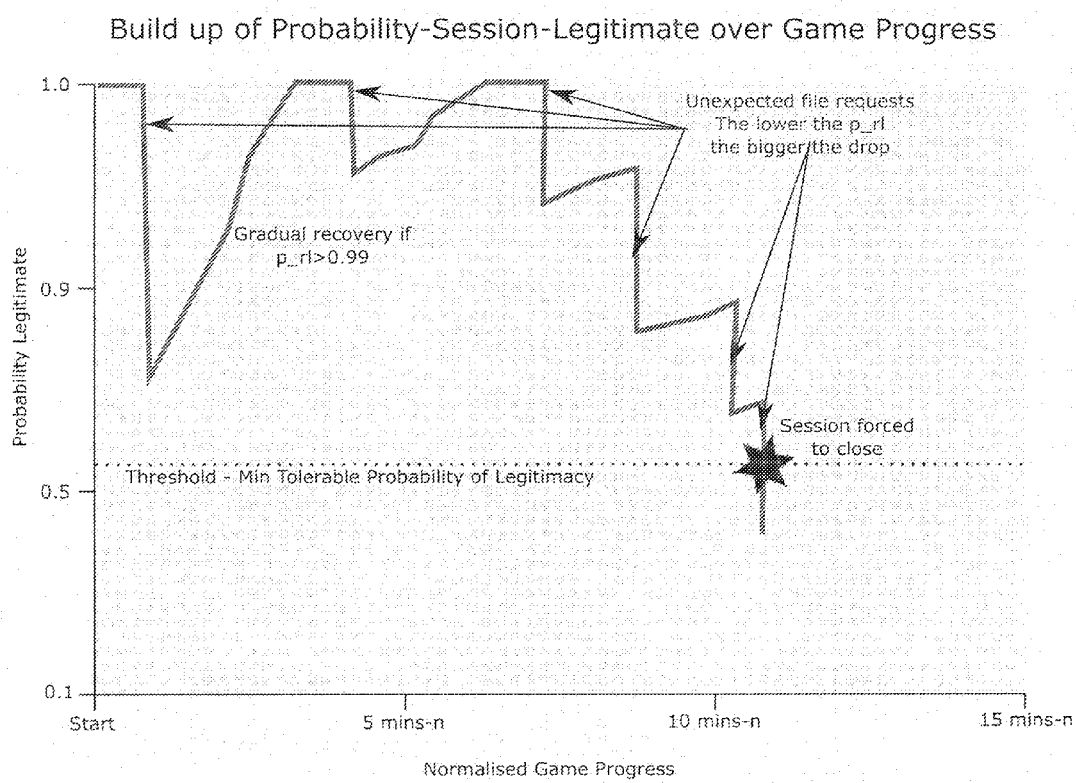
FIG. 13 is a graph illustrating an example distribution of file access events.

FIG. 13 is a graph illustrating distribution of file access events against elapsed playing time of a game-type content. In one embodiment, a normalised game progress is recorded as a time value (e.g. expressed in seconds from a certain start point) and then statistical measures are derived from those normalised times for each file. For instance, in the graph of FIG. 13, a different mean and standard deviation ($\sigma$) are maintained for each game. For example, File 1 is only accessed at the start so would get a comparatively low $\sigma$ & low mean, File 2 is accessed equally at any time, so would have a very large σ, whereas Files 3 and File 4 have a reasonably distinct spread of times when they would be accessed. Using this model, any given key request can be tested, such as by using a normal approximation, for the likelihood that the individual key request would occur at that point in the game.

Figure 14:
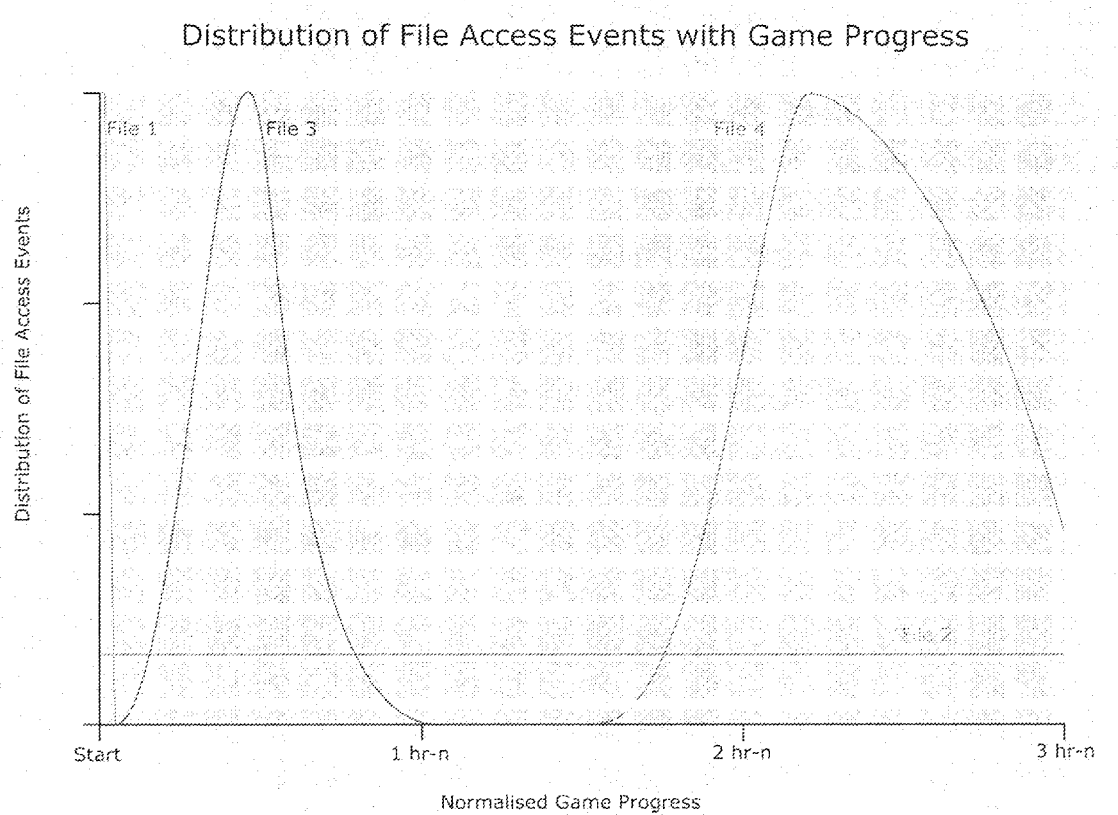
FIG. 14 is a graph illustrating an iterative calculation of a legitimacy probability.

FIG. 14 is a graph showing an iterative evolution over time of the probability calculation for a particular game session with a certain client device 200. In this example the probability drops early during the session (in the first 5 minutes) due to the calculations described above, then recovers in response to the repeated updating of the calculation in later key requests. However, the probability then drops again until breaching a set threshold which is used to indicate a non-legitimate session. In this example, the session is terminated.

Figure 15:
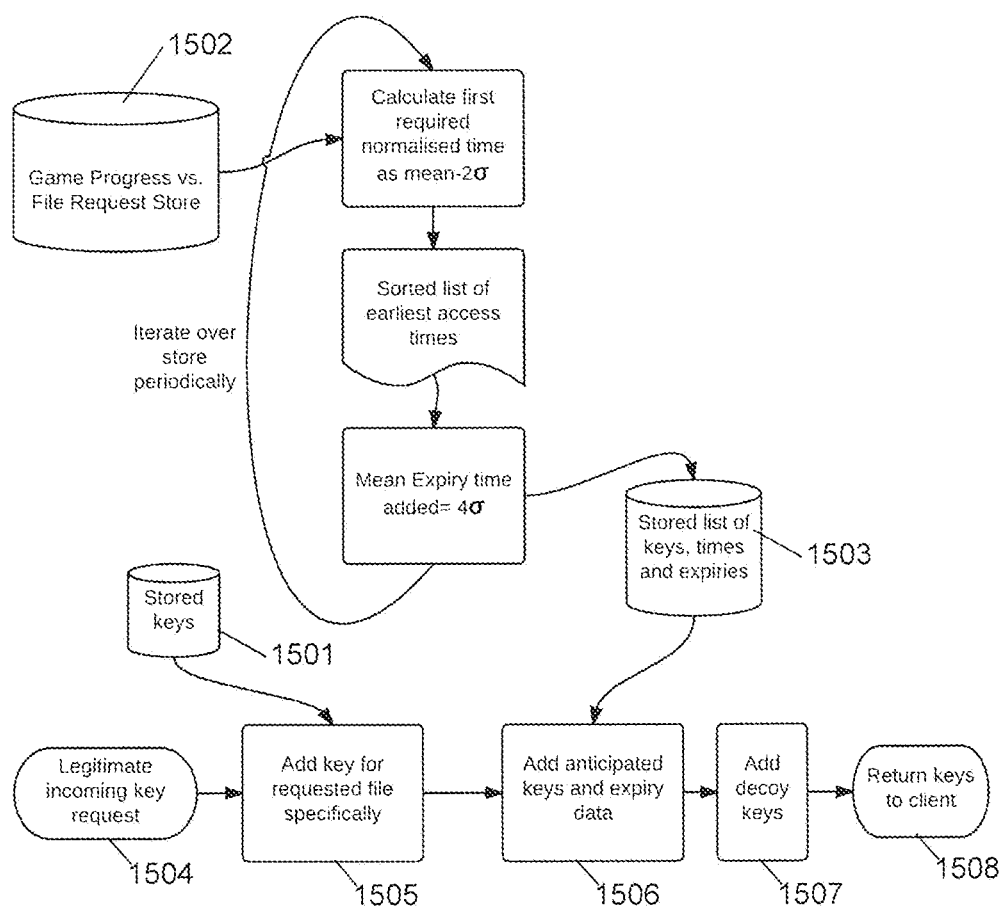
FIG. 15 is a flowchart of another example method for controlling access to content.

FIG. 15 is a schematic flowchart of a process operated by the server 100 for controlling access to content keys by a client device 200. At step 1501, a set of keys is prepared which will permit access to a set of content files that together comprise a content to be played. At step 1502, the statistical model is created by logging key requests from each of a population of client devices 200 for those keys. At step 1503, the model is used to derive an ordered list of the keys in relation to their anticipated use times, and their anticipated expiry times.

At step 1504, an incoming key request is received from a current client device 200. The key request is determined to be legitimate in the manner discussed herein, and one or more keys are added into a response message at step 1505. Additional anticipated keys may be added to the response message at step 1506. Also, key expiry times may be added. Further, one or more decoy keys may be introduced at step 1507. The response message is then returned to the client device 200 at step 1508. The client device then performs appropriate steps to unpack the message and implement the content thereof, as will be appreciated from the discussion herein.

In one example implementation, a list is derived from the statistical model thereby ordering the keys by a normalised gameplay time value. That list is then sampled when a key request is received, to provide a group of keys which will be supplied back to the client device 200. In one example, a periodic process iterates over the keys calculating an earliest expected progress GPmin, as a normalised time, as in Equation 3:

$$GPmin = GPmean - k*\sigma \quad \text{(Eq. 3)}$$

In practice, different games are more or less tolerant of waiting for keys, and varying quantities of historical data will be available on which to predict GPmin. For this reason the modifier variable k may start relatively high, around 2.5, then decrease to around 1.5 as more data is available. If too many urgent key requests are seen in a certain time interval, k can be increased immediately to reduce the volume of urgent key requests.

In one example, the same model can further be used to determine key expiry times. That is, a key may be removed from the cache at the client device when the elapsed playing time has reached a certain time. This expiry time can be set by the server 100 when supplying the keys, and enforced on the client device 200 in order to remove expired keys from the cache. The expiry time may be calculated according to the model, such as according to Equation 4:

$$ExpiryGameProgress = 2*k*\sigma \quad \text{(Eq. 4)}$$

The time that a particular a key is available on the client device 200 is normally evenly distributed around the mean. Just as it is undesirable to have too many key requests due to the impact on the gameplay, having too few can equally be problematic as it may lead to too many of the keys being available in the cache and therefore aiding hacking. For this reason the expiry time may be beneficially reduced to maintain a lower number of keys in the client cache. In turn, reducing the number of keys stored on the client may enforce a desired level of urgent key requests, which consequently can be used to signify legitimate behaviour.

Games often include very large files (typically 1 GB), which are randomly accessed during the game. In addition, other files often have consistent headers that can help a hacker match keys to files. Therefore, in order to further challenge hackers, some files may be encrypted with different keys for different blocks within the file. Hence programmatically matching a key to a given start of a file does not necessarily help the hacker find the keys for the rest of that same file.

Similarly, the challenge of matching keys to content can be further increased by providing multiple decoy keys that are returned with the genuine keys in each set. The small size of keys makes it practical to send many such decoy keys. In addition, if the cache of keys needs little change, then the bulk of the returned key list may be decoy keys.

The example system and method have many advantages as will be apparent from the discussion herein. For example, undesired behaviour is readily detected from the observed asset list. Content is delivered quickly and efficiently, by dividing the content into multiple discrete sections which may be delivered according to progress through the virtual environment. Further, the system remains secure in use.

The invention as described herein may be industrially applied in a number of fields, including particularly the field of delivering multimedia content for a virtual environment across a network from a server device to client device.

At least some of the example embodiments may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks.

Elements of the example embodiments may be configured to reside on an addressable storage medium and be configured to execute on one or more processors. That is, some of the example embodiments may be implemented in the form of a computer-readable storage medium having recorded thereon instructions that are, in use, executed by a computer system. The medium may take any suitable form but examples include solid-state memory devices (ROM, RAM, EPROM, EEPROM, etc.), optical discs (e.g. Compact Discs, DVDs, Blu-Ray discs and others), magnetic discs, magnetic tapes and magneto-optic storage devices.

In some cases the system is distributed over a plurality of separate computing devices that are coupled by a suitable communications network, such as a wired network or wireless network. Functional elements of the invention may in some embodiments include, by way of example, components such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements.

Although a few preferred embodiments have been shown and described, it will be appreciated by those skilled in the art that various changes and modifications might be made without departing from the scope of the invention, as defined in the appended claims.

The invention claimed is:

1. A computer system, comprising:
a computer server device configured to supply one or more content packages to a client device, wherein each content package comprises a plurality of asset files, and wherein the client device is configured to store the asset files from the computer server device, and to generate a virtual environment based on the asset files to be displayed on a display unit associated with the client device;
a circuit configured to execute a tracker function configured to record a sequence of access requests made by the client device in relation to the asset files according to progress through the virtual environment, and to distinguish between legitimate and non-legitimate behaviour according to the recorded sequence of access requests; and
wherein the tracker function is configured to hold a model gathered by observing a population of other client devices which have progressed through the virtual environment using the asset files, and to compare a current access request in relation to the asset files by the client device against the model to distinguish between the legitimate and non-legitimate behaviour; and
wherein the access requests include at least one of:
a file access request made by the client device to access a particular asset file;
a package access request made by the client device to access a content package containing one or more of the asset files; and
a key access request made by the client device to access a decryption key which decrypts at least one of the asset files or decrypts a content package containing one or more of the asset files.

2. The computer system of claim 1, wherein the circuit configured to execute the tracker function is further configured to record an elapsed time value for each access request, the elapsed time value representing an elapsed time of progress through the virtual environment at the client device, and to compare the elapsed time value of the current access request against the model which represents a statistical distribution of corresponding elapsed time values gathered from the population of other client devices.

3. The computer system of claim 2, wherein the circuit configured to execute the tracker function is further configured to compare a plurality of the elapsed time values for the sequence of access requests made in response to progress through the virtual environment at the client device against the model to distinguish between the legitimate and non-legitimate behaviour of the client device.

4. The computer system of claim 1, wherein the circuit configured to execute the tracker function is further configured to record an asset list comprising an ordered list of the content packages which are downloaded from the computer server device to the client device to generate the virtual environment in response to progress through the virtual environment.

5. The computer system of claim 4, wherein the content packages are associated with respective sections of the virtual environment, such that progress through the virtual environment involves a plurality of the content packages in sequence, and wherein the circuit configured to execute the tracker function is further configured to record an asset list identifying the sequence of the content packages supplied to the client device.

6. The computer system of claim 1, wherein each content package is encrypted and is associated with a respective decryption key, and wherein the circuit configured to execute the tracker function is further configured to record the sequence of decryption keys supplied to the client device.

7. The computer system of claim 1, wherein the circuit configured to execute the tracker function is further configured to record a sequence of the asset files used by the client device to generate the virtual environment in response to progress through the virtual environment at the client device.

8. The computer system of claim 7, wherein the circuit configured to execute the tracker function is further configured to record a sequence of file access requests made at the client device to retrieve the asset files from a local storage device.

9. The computer system of claim 7, wherein the tracker function comprises a disc access module on the client device arranged to intercept system calls made by executing code to retrieve the asset files from the local storage device into a memory to be processed by a processing circuit to generate the virtual environment at the client device.

10. The computer system of claim 1, wherein each of the content packages comprises a plurality of the asset files having a plurality of different file types and an original file order, wherein the server device packs the asset files in the content package according to their file type, and wherein the client device unpacks the asset files from the content package and stores the asset files of the unpacked content package according to their original file order.

11. The computer system of claim 10, wherein the computer server device applies one of a plurality of predetermined compression algorithms to the packed asset files according to their file type, and the client device applies a corresponding decompression algorithm to the asset files according to their file type.

12. A method of providing content from a computer server device to a client device over a network, comprising:
by the computer server device:
supplying one or more content packages to a client device, wherein each said content package comprises a plurality of asset files, and wherein the client device is configured to store the asset files and to generate a virtual environment based on the asset files to be displayed on a display unit associated with the client device;
recording a sequence of access requests made by the client device in relation to the asset files according to progress through the virtual environment;
holding a model gathered by observing a population of other client devices which have progressed through the virtual environment using the asset files;
distinguishing between legitimate and non-legitimate behaviour of the client device according to the recorded access requests, by comparing a current access request by the client device in relation to the asset files against the model to distinguish between the legitimate and non-legitimate behavior; and wherein the access requests include at least one of:
a file access request made by the client device to access a particular asset file;
a package access request made by the client device to access a content package containing one or more of the asset files; and
a key access request made by the client device to access a decryption key which decrypts at least one of the asset files or decrypts a content package containing one or more of the asset files.

13. The method of claim 12, further comprising:
recording an elapsed time value for each of the access requests, the elapsed time value representing an elapsed time of progress through the virtual environment at the client device, and
comparing the elapsed time value of the current access request against the model which represents a statistical distribution of corresponding elapsed time values gathered from the population of other client devices, to distinguish between the legitimate and non-legitimate behaviour of the client device in relation to the current access request.

14. The method of claim 12, further comprising:
extracting a plurality of asset files from a content package;
recording metadata which determines an original order of the asset files within the content package;
sorting the asset files by their file type;
compressing the asset files using a plurality of different compression algorithms according to their respective file type, including compressing asset files of a first file type with a first compression algorithm and compressing asset files of a second file type with a second compression algorithm;
binding the sorted and compressed asset files into a new content package;
providing the new content package from the computer server device to the client device over a network according to progress through the virtual environment which is generated at the client device using the asset files;
recording an asset list which represents the asset files used to generate the virtual environment at the client device, wherein the asset list comprises a list of the new content packages supplied to the client device; and
distinguishing between legitimate and non-legitimate behaviour of the client device in relation to the asset files according to the recorded asset list of the new content packages.

15. The method of claim 14, further comprising:
encrypting the new content package at the computer server device with a master key;
decrypting the new content package at the client device with the master key which is common to the client device and to a plurality of the other client devices;
re-encrypting the new content package at the client device with a user-specific key which is unique to the client device; and
re-decrypting the new content package at the client device with the user-specific key in response to progress through the virtual environment generated at the client device.

16. A non-transitory machine readable medium having recorded thereon instructions that, when executed by a processing circuit of a computer, causes the computer to:
provide one or more content packages at a client device, wherein each said content package comprises a plurality of asset files, and wherein the client device is configured to store the asset files and to generate a virtual environment based on the asset files to be displayed on a display unit associated with the client device;
record a sequence of access requests made by the client device in relation to the asset files according to progress through the virtual environment,
hold a model gathered by observing a population of other client devices which have progressed through the virtual environment using the asset files;
distinguish between legitimate and non-legitimate behaviour of the client device according to the recorded access requests by comparing a current access request by the client device in relation to the asset files against the model; and
wherein the access requests include at least one of:
a file access request made by the client device to access a particular asset file;
a package access request made by the client device to access a content package containing one or more of the asset files; and
a key access request made by the client device to access a decryption key which decrypts at least one of the asset files or decrypts a content package containing one or more of the asset files.

* * * * *